3,091,649
Patented May 28, 1963

3,091,649
PREPARATION OF SATURATED HYDROCARBONS FROM AROMATICS
Abraham Schneider, Overbrook Hills, Pa., assignor to Sun Oil Company, Philadelphia, Pa., a corporation of New Jersey
No Drawing. Filed June 30, 1960, Ser. No. 39,828
7 Claims. (Cl. 260—667)

This invention relates to the preparation of saturated hydrocarbons by reaction of aromatic hydrocarbons with hydrogen under novel reaction conditions that lead to various saturated hydrocarbon products. The invention also can be utilized to remove interfering aromatic components from mineral oil fractions which are to be converted in a reaction catalyzed by an aluminum halide catalyst and to produce valuable saturated hydrocarbons from the aromatics so removed.

The hydrogenation of aromatic hydrocarbons to form saturated hydrocarbons heretofore has been carried out by means of such catalysts as Raney nickel, nickel on kiesulguhr, platinum oxide and copper chromite. The present invention provides an entirely different way of hydrogenating aromatics, whereby there is obtained a variety of saturated hydrocarbons including some having a different number of carbon atoms per molecule than the aromatic starting material. The saturated product includes both naphthenic and isoparaffinic components.

It has been proposed heretofore to utilize aluminum bromide promoted with hydrogen bromide for effecting the isomerization and cracking of saturated hydrocarbons at relatively low temperatures. Generally the charge stock must be essentially aromatic-free, as aromatic components will readily form a hydrocarbon-insoluble complex with $AlBr_3$ and HBr thus causing a loss of the catalyst. Heretofore no satisfactory method has been available for recovering the $AlBr_3$ from such complex and recycling it for further use in the process. The present invention provides a means of recovering the $AlBr_3$ from the complex and concurrently converting the aromatic component thereof into useful saturated hydrocarbon product.

In one embodiment a benzoid hydrocarbon or a mixture of benzenoid hydrocarbons is admixed with $AlBr_3$ and HBr in sufficient amount to form a complex containing two moles of $AlBr_3$ and one mole of HBr per mole of benzenoid hydrocarbon. The resulting complex, which is insoluble in hydrocarbons, is then dispersed in a saturated hydrocarbon medium which provides a tertiary hydrogen atom in the molecular structure and the dispersion is contacted with hydrogen at a pressure in the range of 50–1000 p.s.i.g. and a temperature in the range of 50–250° C., which temperature is sufficiently high to cause hydrogenation of the benzene rings. This destroys the complex, releasing $AlBr_3$ and simultaneously forming various saturated hydrocarbons from the aromatic component of the complex. The reaction involves to some extent rupture of the hydrocarbon rings with the formation of various isoparaffins and also to an extent saturation of rings with the formation of naphthenes. The saturated hydrocarbon product can be separated from the $AlBr_3$ by crystallization and decantation or by distillation, and the $AlBr_3$ can be re-used in the process.

In the above-described process it is essential that at least two moles of $AlBr_3$ and at least one mole of HBr be used per mole of benzenoid hydrocarbon. Excess amounts of the $AlBr_3$ and HBr can be present without any deleterious effect. However, if less than the specified amounts are employed, the excess benzenoid hydrocarbon, instead of undergoing the desired hydrogenation reaction, will polymerize and dehydrogenate to a viscous oily type of product. The reaction between the aromatic and the $AlBr_3$ and HBr is mildly exothermic, and the complex that forms with any particular aromatic has a definite composition in which two moles of $AlBr_3$ and one mole of HBr are combined with one mole of the aromatic. These complexes are generally relatively stable, mobile liquids ranging in color from red to orange. The complex formed with benzene, however, is rather unstable and tends to decompose upon warming or if the pressure of HBr is released.

The necessity of having present during the hydrogenation step a saturated hydrocarbon that provides a tertiary hydrogen atom depends upon the particular benzenoid hydrocarbon being reacted. If the aromatic does not have a hydrocarbon substituent that contains a non-primary hydrogen on the alpha carbon (i.e. either secondary or tertiary hydrogen), then it is essential that the tertiary hydrogen-containing saturated hydrocarbon be present during the hydrogenation step. Thus, if the aromatic is benzene, toluene, a xylene, a trimethyl or tetramethyl benzene, or tertiary butyl benzene, a saturated hydrocarbon having a tertiary carbon atom must be used, since none of these aromatics contains a substituent having either a secondary or tertiary hydrogen at the alpha carbon atom. In such case it is generally desirable that at least two moles of the saturate be present per mole of aromatic in the complex. Considerably larger amounts of the saturate can be used, for example, up to ten moles per mole of aromatic in the complex.

The saturated hydrocarbon that provides a tertiary hydrogen atom can be either an isoparaffin or a naphthene. Any isoparaffin having a tertiary hydrogen atom, or mixture of such isoparaffins, is suitable. For example, isoparaffins having from four to fifteen carbon atoms per molecule can be used. Likewise any naphthene having a tertiary hydrogen can be used, for example, methylcyclopentane, ethylcyclopentane, methylcyclohexane, dimethylcyclohexane, propylcyclohexane, tetramethylcyclohexane, tertiary butylcyclohexane, decalin, methyldecalins, etc.

In cases where a substantial excess of $AlBr_3$ and HBr over the amounts required to form the complex are used, the saturated hydrocarbon which is used to form a dispersion with the complex need not have a tertiary carbon atom at the time the dispersion is formed. This is for the reason that some isomerization will occur in the presence of the excess $AlBr_3$ and HBr, thus converting the hydrocarbon partly to one which provides a tertiary hydrogen. For example, n-hexane and cyclohexane, which do not contain tertiary hydrogens, will isomerize in the presence of $AlBr_3$ and HBr to methylpentanes and methylcyclopentane, respectively, thus providing the necessary tertiary hydrogen.

In another embodiment of the invention the charge aromatic is one or more aromatics which have a substituent that has either a secondary or tertiary hydrogen on the alpha carbon atom. In this case hydrogenation of the $AlBr_3$-HBr-aromatic complex will proceed even if no saturated hydrocarbon is added which provides a tertiary hydrogen atom. Examples of aromatics which do not require the presence of such saturated hydrocarbon are ethylbenzene, propylbenzene, isopropylbenzene, isobutylbenzene, tetralin and the like. Since these have either a secondary or tertiary hydrogen at the alpha carbon, their complexes will undergo the desired hydrogenation reaction in the absence of added saturated hydrocarbon. In this case, after the complex is formed, it is intimately contacted with hydrogen at 50–1000 p.s.i.g. and a temperature in the range of 50–250° C. until saturation of the hydrocarbon component has occurred. The resulting saturated product can then be decanted or distilled from the AlBr₃ and the latter can be re-used.

The temperature required for the hydrogenation reaction varies depending upon the particular aromatic components of the complex. Thus, benzene begins to hydrogenate at substantial rate at 50° C., tetralin at 70° C., and p-xylene at 115° C. Generally it is desirable to operate at a temperature which is 20–30° C. higher than that at which the hydrogenation rate becomes substantial. Considerably higher temperatures up to about 250° C. can be used but the higher temperatures tend to produce more low boiling saturates. Hence it is generally desirable to operate at a temperature below 160° C. to avoid excessive cracking.

The invention can be utilized in conjunction with an isomerization or hydrocracking process for up-grading a mineral oil distillate fraction utilizing AlBr₃ promoted with HBr as catalyst. One such process, as described in my copending application Serial No. 25,509, filed April 29, 1960, permits the conversion of any $C_8$ or higher distillate fraction which is free of unsaturated hydrocarbons substantially completely into $C_4$–$C_7$ isoparaffins and $C_7$–$C_9$ naphthenes. For example, a kerosene or gas oil fraction can be converted to these products. The catalyst is AlBr₃-HBr dissolved in the hydrocarbon charge, and the reaction is carried out at relatively low temperature in the presence of a $C_7$–$C_9$ naphthene and under a partial pressure hydrogen of 25–500 p.s.i.

In utilizing the invention in conjunction with the above-mentioned process or other conversion processes where an aluminum bromide catalyst is used, a distillate fraction which contains aromatics is first treated with AlBr₃ and HBr in excess of the amounts required to form a complex with the aromatics. This can be done at ambient temperature simply by dissolving AlBr₃ in the hydrocarbon charge in a reactor and pressuring it with HBr while agitating the mixture. The complex forms readily and, when agitation is stopped, will settle out from the hydrocarbon layer and can be withdrawn. The resulting hydrocarbon layer is essentially aromatic free. The excess AlBr₃ and HBr remain largely in the saturated hydrocarbon layer and can be utilized for effecting its desired conversion. The complex separated from the mixture can be dispersed in a hydrocarbon that provides a tertiary hydrogen and then hydrogenated in the manner previously described. After the reaction is complete, the HBr and at least a part of the saturated product can be distilled from the mixture, leaving as residue the AlBr₃ together with sufficient hydrocarbon to provide a pumpable mixture. The AlBr₃ solution can then be recycled in the process.

In operating in this manner it is not necessary that the complex be completely hydrogenated. A partial hydrogenation sufficient to allow the separation of a substantial amount of hydrocarbons will yield a complex containing sufficient regenerated AlBr₃ to be usable as recycle for treating additional amounts of the aromatic-containing hydrocarbon charge.

The following examples, in which percentages are by weight, illustrate the invention more specifically:

EXAMPLE I

A small steel rocker bomb was charged with 2.6 g. of benzene (0.034 mole), 6.6 g. of 3-methylpentane (0.077 mole), 19.9 g. of AlBr₃ (0.074 mole) and 3.6 g. of HBr (0.044 mole). The hydrocarbon composition of the charge mixture thus was 70.2% of 3-methylpentane and 29.8% of benzene. A hydrogen partial pressure of 310 p.s.i. was applied and the bomb was shaken at 27° C. From time to time when the pressure in the bomb had dropped about 20 p.s.i. additional hydrogen was admitted to raise the pressure to its original level. After 208 minutes at 27° C., the amount of gas that had been consumed was equivalent to 68 p.s.i., indicating a slow reaction. The temperature was then raised to 52° C. and an additional consumption of hydrogen equivalent to 160 p.s.i. occurred in 152 minutes. The bomb after being cooled and opened, was found to contain a light orange solid composed mainly of AlBr₃ and a light yellow organic phase. The latter was washed and then analyzed by vapor phase chromatography, with results as shown in Table I.

Table I

Composition of hydrocarbon phase, wt. percent:

| | |
|---|---|
| $C_4$ paraffins | 1.8 |
| $C_5$ paraffins | 0.4 |
| $C_6$ paraffins | 77.2 |
| $C_7$ paraffins | --- |
| Methylcyclopentane | 2.2 |
| Cyclohexane | 13.7 |
| Methylcyclohexane | 0.1 |
| Dimethylcyclohexanes | 1.7 |
| $C_{10}$ naphthenes | 0.1 |
| Methyldecalins | 0.3 |
| Dimethyldecalins | 0.7 |

The percentage given for $C_6$ paraffins includes the 3-methylpentane and any of its isomerization products. The tabulated results show that $C_6$ naphthenes were the main hydrocarbon product derived from the complex but that some $C_4$–$C_6$ paraffins and some higher naphthenes were formed. The paraffins obtained were mainly isoparaffins.

When a run similar to the foregoing was made except that the 3-methylpentane was omitted, the product was a mobile, dark red liquid with no free HBr being present. The product when hydrolyzed gave a viscous high boiling oil. This indicates the importance of having a tertiary hydrogen-containing saturate present to prevent polymerization.

EXAMPLE II

This example illustrates the conversion of a p-xylene complex, which requires a higher temperature than for the benzene complex of the preceding example. The rocker bomb was charged with 2.49 g. of p-xylene (0.024 mole), 6.40 g. of 3-methylpentane (0.074 mole), 21.16 g. of AlBr₃ (0.078 mole) and 4.18 g. of HBr (0.052 mole), and a partial pressure of hydrogen of 300 p.s.i. was applied. Reaction was carried out at 114–120° C. with intermittent additions of hydrogen to the original pressure. In 225 minutes of shaking, the amount of hydrogen consumed was equivalent to 337 p.s.i. After cooling the product was separated into a hydrocarbon phase (3.8 g.) and a light brown complex phase (29.4 g.). Hydrolysis of the latter gave 3 cc. of hydrocarbon which was composed largely of hexanes and aromatics having 2–3 rings, with a minor amount of xylene being present. The hydrocarbon phase originally separated was analyzed and results are shown in Table II.

Table II

Composition of hydrocarbon phase, wt. percent:

| | |
|---|---|
| $C_3$ paraffins | 1.7 |
| $C_4$ paraffins | 9.7 |
| $C_5$ paraffins | 8.9 |
| $C_6$ paraffins | 79.1 |
| Methylcyclohexane | 0.2 |
| Dimethylcyclohexanes | 0.4 |

The data show that in this case the main hydrocarbon products from the complex were isoparaffins. The 79.1% $C_6$ paraffins in the product compares with 72.0% of 3-methylpentane in the hydrocarbon charge.

The light brown complex phase obtained in this case includes partially decomplexed aluminum bromide, and the material is sufficiently active to be recycled in a process. In other words it could be used in place of AlBr₃ to react with the aromatics in a hydrocarbon charge. This illustrates the fact that the complex does not have to be completely hydrogenated in order for recycling to be practiced.

EXAMPLE III

The present example illustrates a case where a tertiary hydrogen-containing saturate need not be used since the charge aromatic, namely, tetralin, has a substituent containing a secondary hydrogen atom at the alpha carbon atom. The rocker bomb was charged with 4.83 g. of tetralin (0.037 mole), 22.08 g. of $AlBr_3$ (0.082 mole) and 4.05 g. of HBr (0.051 mole), and a partial pressure of hydrogen of 200 p.s.i. was applied. Reaction was carried out at about 72° C. with intermittent additions of hydrogen. The amount of hydrogen absorbed in 30 minutes was equivalent to 314 p.s.i. The hydrocarbon phase which separated from a light brown complex phase showed the analysis given in Table III.

*Table III*

Composition of hydrocarbon phase, wt. percent:

| | |
|---|---|
| $C_4$ paraffins | 3.7 |
| $C_5$ paraffins | 3.7 |
| $C_6$ paraffins | 72.2 |
| $C_7$ paraffins | 0.4 |
| Methylcyclopentane | 3.0 |
| Cyclohexane | 1.6 |
| Methylcyclohexane | 3.2 |
| $C_8$ naphthenes | 1.0 |
| $C_9$ naphthenes | 0.4 |
| $C_{10}$ naphthenes | 0.2 |
| Decalin | 10.7 |
| Alkyl decalins | |

In this case the charge contained no $C_6$ paraffins and a surprisingly large amount was produced. Also a substantial amount of $C_6$-$C_{10}$ mononuclear naphthenes was formed.

In the embodiment of the invention where a saturated hydrocarbon providing a tertiary hydrogen atom is included in the reaction mixture, it is believed that the saturated hydrocarbon functions as an agent for transferring hydrogen from the gas phase to the aromatic ring. This is thought to occur through a carbonium ion mechanism with hydride transfer between the saturated hydrocarbon and a carbonium ion formed by donation of a proton from the $AlBr_3$-HBr to the aromatic. In the embodiment where such saturated hydrocarbon is not required, the hydrocarbon substituent which has a secondary or tertiary hydrogen atom at the alpha carbon appears to act in similar manner as the hydrogen transfer agent.

I claim:
1. Method of forming saturated hydrocarbon from a benzenoid hydrocarbon which comprises adding to the benzenoid hydrocarbon $AlBr_3$ and HBr in amounts, respectively, of at least two moles and at least one mole per mole of benzenoid hydrocarbon to form a hydrocarbon-insoluble complex, contacting the complex, in the form of a dispersion with a saturated hydrocarbon providing a tertiary hydrogen atom, with hydrogen at a pressure in the range of 50–1000 p.s.i.g. and a temperature in the range of 50–250° C. and sufficient to hydrogenate the benzene rings, and recovering saturated hydrocarbon reaction product from the reaction mixture.

2. Method according to claim 1 wherein said temperature is below 160° C.

3. Method according to claim 1 wherein said benzenoid hydrocarbon is a component of a mineral oil distillate fraction and the molar ratios of $AlBr_3$ and HBr to the benzenoid component are substantially in excess of 2:1 and 1:1 respectively.

4. Method according to claim 1 wherein aluminum bromide is recovered from the hydrogenated product and is re-used for forming a further amount of saturated hydrocarbon in the manner specified.

5. Method of forming saturated hydrocarbon from a benzenoid hydrocarbon having a hydrocarbon substituent providing a non-primary hydrogen atom at the alpha carbon atom which comprises adding to the benzenoid hydrocarbon $AlBr_3$ and HBr in amounts, respectively, of at least two moles and at least one mole per mole of benzenoid hydrocarbon to form a hydrocarbon-insoluble complex, contacting the complex with hydrogen at a pressure in the range of 50–1000 p.s.i.g. and a temperature in the range of 50–250° C. and sufficient to hydrogenate the benzene rings, and recovering saturated hydrocarbon reaction product from the reaction mixture.

6. Method according to claim 5 wherein said temperature is below 160° F.

7. Method according to claim 5 wherein aluminum bromide is recovered from the hydrogenated product and is re-used for forming a further amount of saturated hydrocarbon in the manner specified.

References Cited in the file of this patent

UNITED STATES PATENTS

| | | |
|---|---|---|
| 2,438,211 | Gorin et al. | Mar. 23, 1948 |
| 2,502,958 | Johnson | Apr. 4, 1950 |
| 2,884,469 | McCavlay | Apr. 28, 1959 |
| 2,910,513 | Ridgway et al. | Oct. 27, 1959 |